United States Patent [19]

Kitajima et al.

[11] Patent Number: 5,186,149
[45] Date of Patent: Feb. 16, 1993

[54] SYSTEM FOR CONTROLLING FUEL SUPPLY FOR INTERNAL COMBUSTION ENGINE

[75] Inventors: Shinichi Kitajima, Wako; Yoshihiko Kobayashi, Haga, both of Japan

[73] Assignee: Honda Giken Kogyo Kabushiki Kaisha, Tokyo, Japan

[21] Appl. No.: 810,065

[22] Filed: Dec. 19, 1991

[30] Foreign Application Priority Data

Dec. 25, 1990 [JP] Japan ................... 2-405962

[51] Int. Cl.$^5$ ............................................ F02M 51/00
[52] U.S. Cl. ................................. 123/491; 123/1 A
[58] Field of Search ............... 123/491, 1 A, 575, 494, 123/179.8, 685, 686, 179.7, 179.12; 364/431.1

[56] References Cited

U.S. PATENT DOCUMENTS

| | | | |
|---|---|---|---|
| 4,763,628 | 8/1988 | Mieno et al. | 123/491 |
| 4,945,863 | 8/1990 | Schmitz et al. | 123/1 A |
| 4,967,714 | 11/1990 | Inoue | 123/1 A |
| 4,982,709 | 1/1991 | Oota | 123/1 A |
| 5,014,670 | 5/1991 | Mitsumoto | 123/494 |
| 5,038,730 | 8/1991 | Kashima | 123/179 H |
| 5,056,490 | 10/1991 | Kashima | 123/1 A |
| 5,074,271 | 12/1991 | Suzuki et al. | 123/491 |
| 5,092,297 | 3/1992 | Tsukamoto et al. | 123/491 |
| 5,092,305 | 3/1992 | King | 123/575 |

*Primary Examiner*—Raymond A. Nelli
*Attorney, Agent, or Firm*—Nikaido, Marmelstein, Murray & Oram

[57] ABSTRACT

A system for controlling supply of fuel to a hybrid fuel powered engine during starting. The system has a sensor detecting the alcohol concentration of the fuel, a device for calculating an alcohol correction factor from the detected alcohol concentration, a device for correcting a basic amount of fuel supply in accordance with the alcohol correction factor, a device for increasing or decreasing the factor in increments of a magnitude determined on the basis of the engine coolant temperature once per interval determined on the basis of the engine coolant temperature, and a device for reversing the direction of the increments each time the factor reaches an upper limit value or a lower limit value, whereby the factor is swept over a prescribed range until the engine starts.

6 Claims, 3 Drawing Sheets

SYSTEM FOR CONTROLLING FUEL SUPPLY FOR INTERNAL COMBUSTION ENGINE

BACKGROUND OF THE INVENTION

1. Field of the Invention

This invention relates to a system for controlling the amount of fuel supplied to an engine that uses a fuel containing alcohol, more particularly to such a system for controlling the amount of fuel supplied at the time the engine is started.

2. Description of the Prior Art

Engine fuels containing alcohol and the like are being used increasingly as substitutes for gasoline and other more conventional fuels. Some of these new fuels are blends including a conventional fuel. For example, a mixed gasoline-methanol fuel containing 85% methanol has become generally known as M85. Others are used without blending.

The characteristics of these alternative fuels differ from those of conventional fuels in various ways. For example, the stoichiometric air-fuel ratio of methanol is about 6.5:1, compared with about 15:1 for gasoline, and its latent heat of vaporization is about 280 kcal/kg, compared with about 80 kcal/kg for gasoline. These differences are substantial. In particular, the higher heat of vaporization of methanol means that the amount of heat required for fuel vaporization will increase with increasing methanol concentration of the fuel. As a result, the fuel does not vaporize easily when the engine coolant temperature is low and the engine becomes difficult to start.

Japanese Laid-Open Patent Publication No. Sho 56-104131 teaches a system for improving the start performance of an engine that uses a hybrid fuel containing alcohol. In the proposed system, the amount of fuel to be supplied to the engine is determined on the basis of the alcohol concentration of the fuel detected by an alcohol sensor and when the engine fails to start when supplied with the so-determined amount of fuel, the amount of fuel is increased or decreased until starting is achieved.

As was pointed out above, an engine using an alcohol-containing fuel is fundamentally hard to start and, therefore, the probability of its starting is not necessarily high even when the fuel supply is adjusted to the optimum amount for starting. In the aforesaid prior art system, therefore, there is a fairly high possibility that the engine will fail to start at the time the amount of fuel supply is optimum for starting the engine. If this should happen, the amount of fuel supply will thereafter deviate further and further from the optimum, making it even more unlikely that the engine will start.

Moreover, if something should go wrong with the system's alcohol sensor, the amount of fuel supplied will be determined on the basis of an alcohol concentration that is different from the actual concentration. As the system is incapable of determining whether the amount of fuel supply should be increased or decreased in such circumstances, the adjustment is likely to be made in the wrong direction. In this case the probability of the engine starting becomes almost nil.

This invention was accomplished in view of the foregoing problems and has as its object to provide a system for controlling the amount of fuel supplied for starting an engine that uses a fuel containing alcohol, which system ensures reliable engine starting even when an alcohol sensor constituting a part of the system malfunctions or breaks down.

SUMMARY OF THE INVENTION

This invention achieves this object by providing a system for controlling fuel supply for internal combustion engine provided with a blended fuel of gasoline and alcohol. The system has a first device for determining an alcohol correction factor and a control device for correcting an amount of fuel supply at engine starting at least in response to the determined alcohol correction factor. The improvement in the system comprises the first device includes a second device for increasing or decreasing the alcohol correction factor until it reaches a predetermined reference value unless the engine is started.

BRIEF EXPLANATION OF THE DRAWINGS

These and other objects and advantages of the invention will be more apparent from the following description and drawings, in which.

DETAILED DESCRIPTION OF PREFERRED EMBODIMENT

An embodiment of the invention will now be explained with reference to the drawings.

Figure 1:
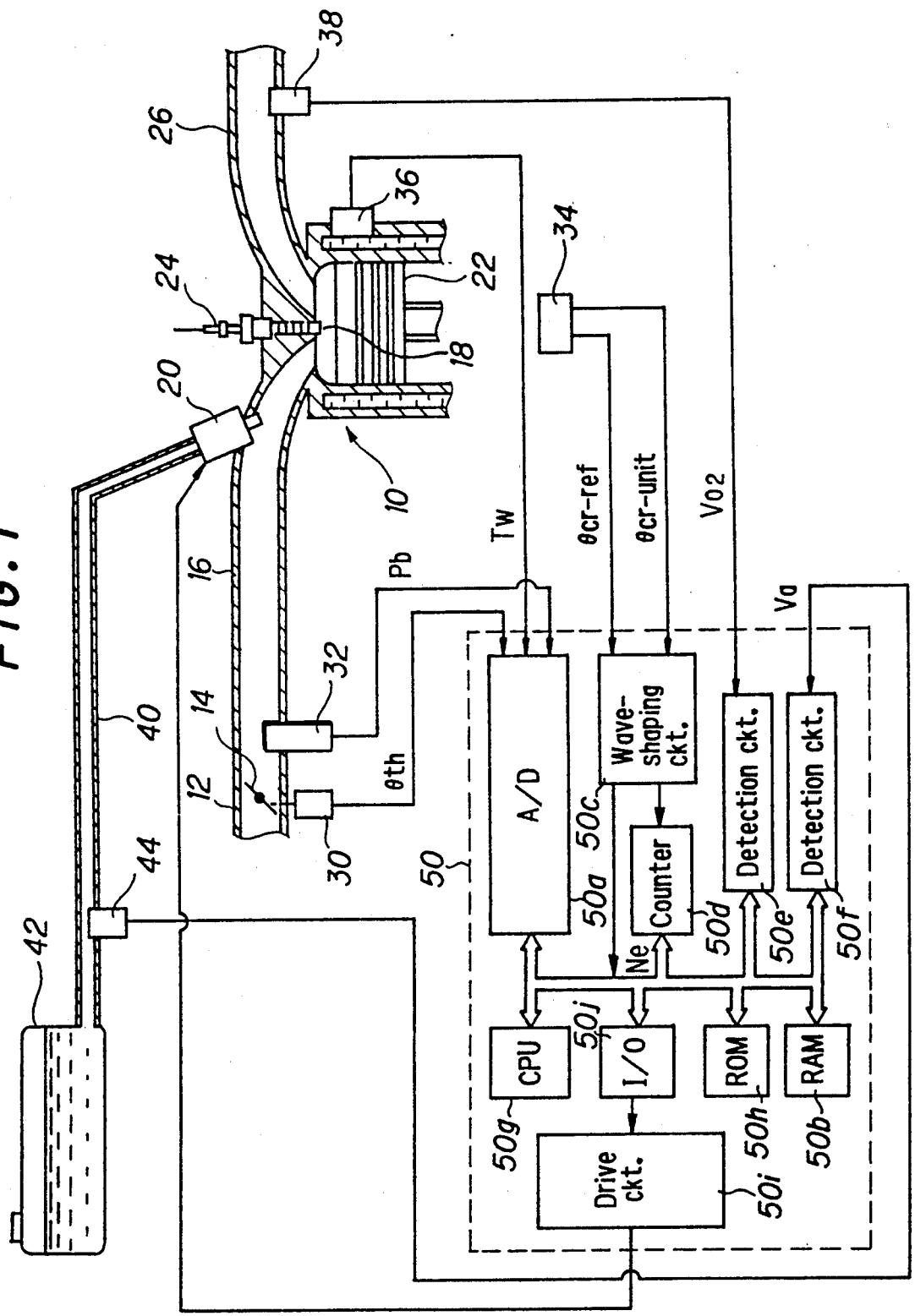
FIG. 1 is a block diagram showing the arrangement of a fuel supply control system for internal combustion engines according to the invention.

In FIG. 1, a four-cylindered vehicle internal combustion engine 10 has an air intake passage 12. Air drawn in through an air cleaner, not shown, has its flow rate controlled by a throttle valve 14 and passes through a manifold 16 integrally connected to the passage to a combustion chamber 18, only one shown. A fuel injection nozzle 20 is provided in the vicinity of the chamber for supplying fuel. The intake air and the fuel are mixed and the resulting air-fuel mixture enters the chamber when an intake valve, not shown, is opened. After it is compressed in the chamber by a piston 22, the air-fuel mixture is ignited by a spark plug 24, whereupon it burns explosively to drive the piston down and the burnt gas is passed to the exterior through an exhaust passage 26 during engine exhaust stroke.

The air intake passage 12 is provided with a throttle position sensor 30 for generating a signal indicative of the opening degree $\theta$th of the throttle valve 14 and a manifold absolute pressure sensor 32, at a position downstream of the throttle valve 14, for producing a signal indicative of a manifold absolute pressure Pb. A crankshaft angle sensor 34 is provided to produce a reference signal $\theta$cr-ref once per 720 crankshaft degrees and a unit signal $\theta$cr-unit per a predetermined degrees. Further, a coolant temperature sensor 36 is provided to generate a signal indicative of a coolant temperature Tw. The exhaust passage 26 has an oxygen sensor 38 for generating a signal corresponding to the oxygen content Vo₂ of the exhaust gas. The fuel injection nozzle 20 is connected, via a fuel supply conduit 40, with a fuel tank 42 containing a blended fuel composed of gasoline and methyl alcohol. An alcohol sensor 44 is equipped in the conduit for generating a signal indicative of the alcohol concentration Va of the fuel.

The output signals from all of the aforesaid sensors are sent to a control unit 50 made up of a microcomputer. In the unit, analog sensor signals are converted into digital signals through an A/D converter 50a and are temporarily stored at a RAM 50b, a portion of which is backed up even when the engine is stopped. The outputs of the crankshaft sensor 34 are waveshaped by a circuit 50c and the signal θcr-unit is then input to a counter 50d to measure an engine speed Ne. The outputs of the sensors 38,44 are sent to the detection circuits 50e,50f respectively. Based on the detected values, a CPU 50g calculates, in accordance with instructions stored in a ROM 50h, the amount of fuel to be supplied in a manner described later and out puts a signal Tout expressing the fuel supply amount in terms of an injection period, to a drive circuit 50i through an I/O port 50j, in order to drive the nozzle 20 to inject the fuel for the period.

The signal Tout is obtained by using an alcohol correction factor Kc calculated from the alcohol concentration Va and other such correction factors to correct a basic fuel supply amount set in advance on the basis of the engine coolant temperature Tw and other engine conditions and stored in the RAM 50b of the control unit 50. If the alcohol sensor 44 should fail (malfunction or break down), the aforesaid correction of the basic fuel supply amount is conducted using an estimated correction factor determined from the actual air-fuel ratio calculated from the aforesaid oxygen content $V_{O2}$ during operation of the engine 10. The alcohol correction factor is stored as a backup value Kb in the backup portion of the RAM 50b of the control unit 50.

The actual alcohol concentration of the fuel does not change when the vehicle equipped with the engine is being driven since fuel cannot normally be supplied to the fuel tank 42 at such times. Therefore, the determination as to whether or not the alcohol sensor 44 has failed can be made on the basis of whether or not the fluctuation in the output value of the alcohol sensor 44 exceeds a prescribed value. This is only one example, however, and various other methods of detecting sensor failure are also usable.

Figure 2:
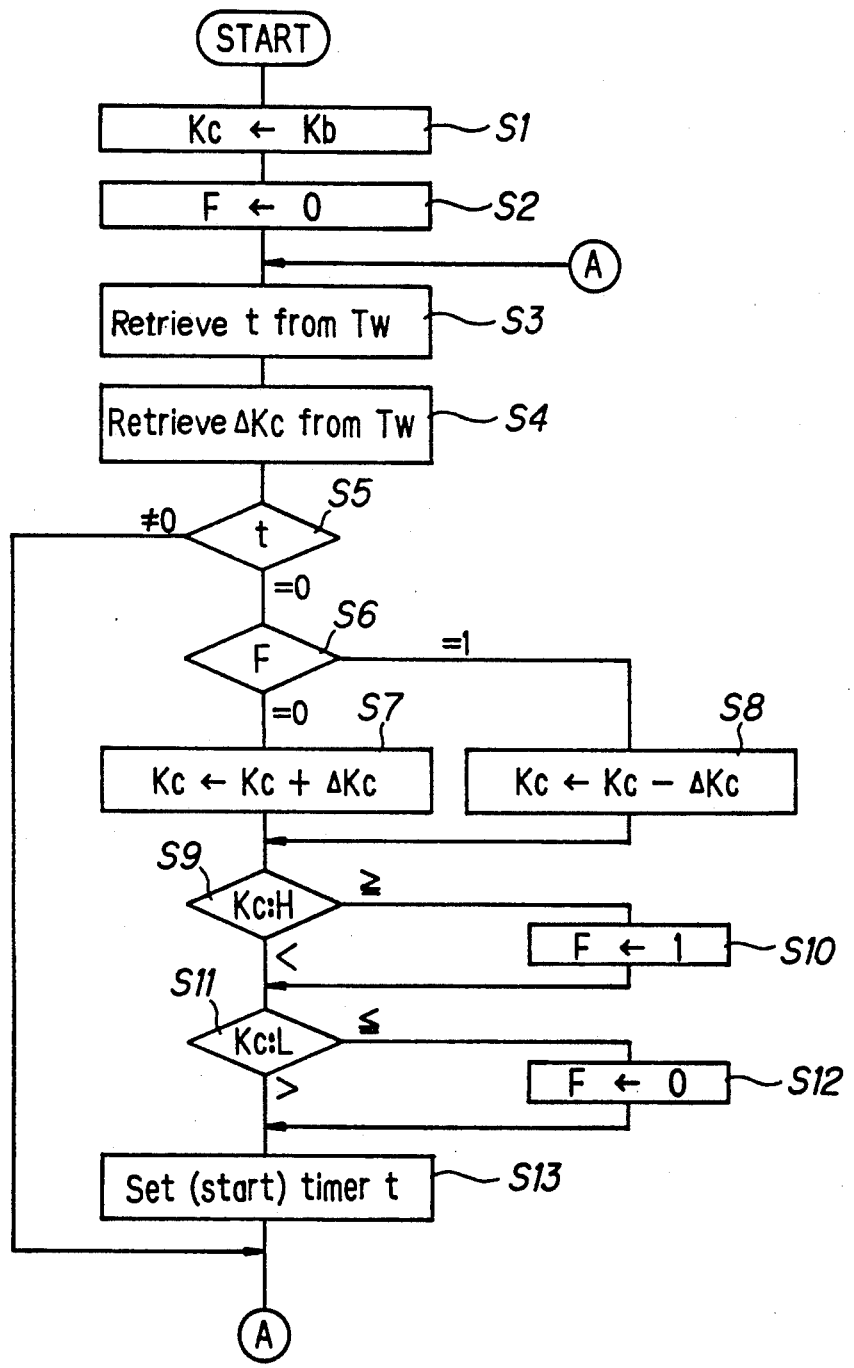
FIG. 2 is a flowchart showing mode of operation of the system.
Figure 3:
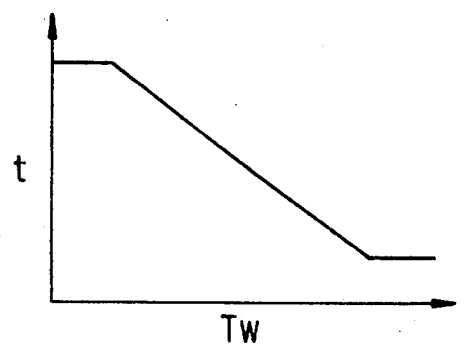
FIG. 3 is a graphical representation of engine temperature versus prescribed interval used in the flowchart of FIG. 2.
Figure 4:
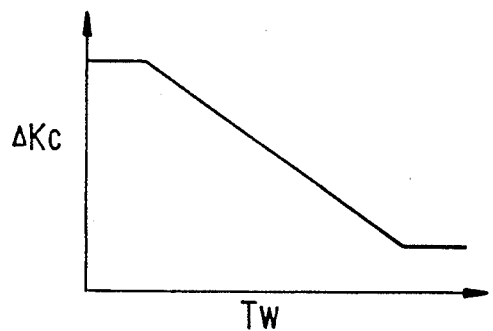
FIG. 4 is a graphical representation of engine temperature versus prescribed fuel amount increment used in the flowchart of FIG. 2.
Figure 5:
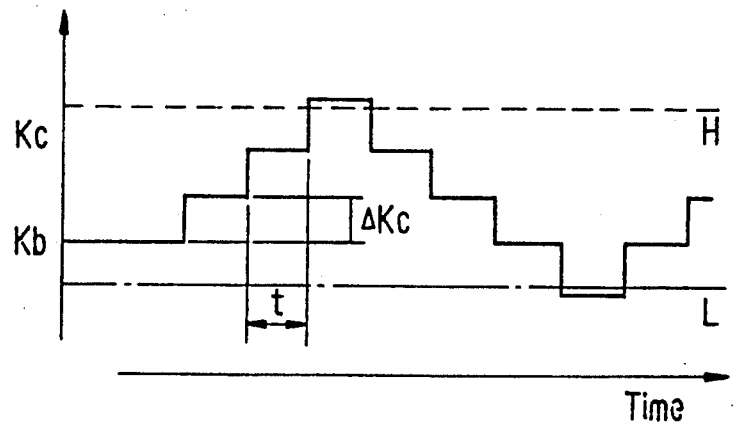
FIG. 5 is a timing chart explaining the control illustrated in the flowchart of FIG. 2.

Next, mode of operation of the system will now be explained with reference to the flowchart of FIG. 2 and the graphs of FIGS. 3 to 5.

When the operation for starting the engine 10 is initiated, the control procedure first fetches the backup value stored in the RAM 50b in step S1 and uses this value as the alcohol correction factor Kc during engine starting. The procedure then moves to step S2 in which a flag F prescribing that changes to be made in the alcohol correction factor Kc are to be made in the increase direction is set to zero. (The alcohol correction factor is increased when the flag F is set to 0 and decreased when set to 1.) The procedure then advances to step S3 in which the coolant temperature Tw, which represents the temperature of the engine 10, is used as address data for retrieving a change interval t from a table prepared and stored in the ROM 50h of the control unit 50 in advance. A timer (down counter) is then set to the retrieved time t and is started. An example of the relationship between the coolant temperature Tw and the change interval t is shown in FIG. 3, from which it will be noted that change interval t increases with decreasing coolant temperature Tw. The procedure then goes to step S4 in which the coolant temperature Tw is again used as address data for retrieving an increment delta Kc from a table prepared and stored in the ROM 50h in advance. As shown in FIG. 4, the increment delta Kc increases with decreasing coolant temperature Tw.

In the following step S5 the alcohol correction factor Kc is maintained at backup value Kb and an amount of fuel corrected by the backup value Kb is supplied to engine 10 until the timer counted down to zero. (The timer is never reset at an intermediate value before counting down to zero.) If the engine does not start by the time that the timer reaches zero, i.e. by the time that the change interval t has lapsed, the procedure advances to the following step S6. In step S6 the setting of the flag F is checked and if it is zero, the procedures moves to step S7 in which the alcohol correction factor Kc is increased by increment delta Kc. If the flag is found to be set to 1 in step S6, the procedure goes to step S8 in which the alcohol correction factor Kc is decreased by increment delta Kc. In either case, the procedure thereafter advances to step S9 in which the new alcohol correction factor is compared with an upper limit H. If it is found to be equal to or greater than the upper limit H, the flag is set to 1 in step S10 so that the direction of change of the factor will be reversed from increase to decrease in the next cycle. Then in step S11, the alcohol correction factor is compared with a lower limit L and if it is found to be equal to or smaller than the lower limit L, the flag is set to 0 in step S12 so that the direction of change will be reversed from decrease to increase in the next cycle. This brings the procedure to step S13 in which the counter is set to a freshly retrieved change interval t to run and engine cranking is continued for the period of the new change interval t using an amount of fuel supply corrected using the increased/decreased alcohol correction factor obtained in step S7 or step S8. The foregoing steps are thereafter repeated until the engine 10 starts. While the alcohol correction factor Kc is increased/decreased from the backup value Kb by an increment of delta Kc once every change interval t during the cranking operation, as shown in FIG. 5, since the direction of the increment is reversed when the value of the factor reaches the upper limit H or the lower limit L, the factor Kc is repeatedly swept back and forth between the two limits until the engine starts.

When the engine is cold, it takes a long time for the engine to start even when the amount of fuel supply is optimum. Since the aforesaid interval is set to be relatively long when the engine temperature is low, this minimizes the probability of the engine not starting and the fuel supply amount consequently being changed even though the optimum amount of fuel is being supplied. Moreover, the fuel supply amount is incremented relatively large when the coolant temperature is low so as to ensure the optimum amount of fuel supply will be achieved quickly. Therefore, even if the engine 10 does not start the first time that the factor Kc is optimum for engine starting, eventual starting is ensured by the fact that this optimum value will be returned to as many times as necessary. Moreover, engine starting is also ensured even if the backup value Kb should deviate from the proper value of the for the actual alcohol concentration due to a problem with the alcohol sensor 44.

The present invention has thus been shown and described with reference to the specific embodiments. However, it should be noted that the present invention is in no way limited to the details of the described arrangements but changes and modifications may be made without departing from the scope of the appended claims.

What is claimed is:

1. A system for controlling fuel supply for an internal combustion engine provided with a blended fuel of gasoline and alcohol, the system comprising:

first means for determining an alcohol correction factor in accordance with an alcohol concentration in the fuel;

second means for one of increasing and decreasing the alcohol correction factor by a prescribed amount between an upper limit and a lower limit within a predetermined time period unless the engine is started; and control means for correcting an amount of fuel supply at engine starting at least in response to the determined alcohol correction factor.

2. A system according to claim 1, wherein said second means includes third means for changing a direction of change of the alcohol correction factor when the correction factor has reached one of the upper limit and the lower limit.

3. A system according to claim 1, wherein the prescribed amount is set to decrease as the engine coolant temperature rises.

4. A system according to claim 1, wherein said predetermined time period is set to decrease as the engine coolant temperature rises.

5. A system according to claim 1, wherein said first means includes fourth means for detecting said alcohol concentration in the fuel and for determining the alcohol correction factor based on the detected alcohol concentration.

6. A system according to claim 1, wherein said first means further includes fifth means for detecting air/fuel ratio in the engine exhaust gas to estimate alcohol concentration in the fuel, and for determining the alcohol correction factor based on the estimated alcohol concentration.

* * * * *